(12) United States Patent
Murakami et al.

(10) Patent No.: US 8,178,831 B2
(45) Date of Patent: May 15, 2012

(54) IMAGE DISPLAY APPARATUS COMPRISING AN ENCLOSURE HAVING FIRST AND SECOND DUCTS AND SHUT-OFF PLATES FOR VENTILATION

(75) Inventors: Kosaku Murakami, Tokyo (JP); Koichi Murakami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 405 days.

(21) Appl. No.: 12/613,702

(22) Filed: Nov. 6, 2009

(65) Prior Publication Data

US 2010/0118275 A1 May 13, 2010

(30) Foreign Application Priority Data

Nov. 13, 2008 (JP) .................................. 2008-291047

(51) Int. Cl.
*H01J 5/02* (2006.01)
(52) U.S. Cl. ......................................... 250/239; 353/61
(58) Field of Classification Search .................. 250/239, 250/208.1, 238; 353/57, 52, 61, 60, 119; 349/5
See application file for complete search history.

(56) References Cited

U.S. PATENT DOCUMENTS 6,471,357 B1 * 10/2002 Hara et al. ...................... 353/57

FOREIGN PATENT DOCUMENTS

| JP | 8-140024 A | 5/1996 |
| JP | 2001-343708 A | 12/2001 |

* cited by examiner

*Primary Examiner* — Que T Le
(74) *Attorney, Agent, or Firm* — Birch, Stewart, Kolasch & Birch, LLP

(57) ABSTRACT

An enclosure has ducts formed therein and extending in a vertical direction along the left and right side surfaces as viewed from the rear side. The duct is formed in a region defined between a lefthand wall surface of the enclosure and a lefthand partition wall provided in the enclosure and in parallel to the lefthand wall surface. The screen side of the region defined between the lefthand wall surface and the lefthand partition wall is covered with a partition wall, and the opposite side of the region is covered with a cover not shown to serve as an air flow path. The duct is formed in a region defined between a righthand wall surface of the enclosure and a righthand partition wall provided in the enclosure and in parallel to the righthand wall surface. The screen side of the region defined between the righthand wall surface and the righthand partition wall is covered with a partition wall, and the opposite side of the region is covered with a cover not shown to serve as an air flow path.

3 Claims, 12 Drawing Sheets

F I G . 1
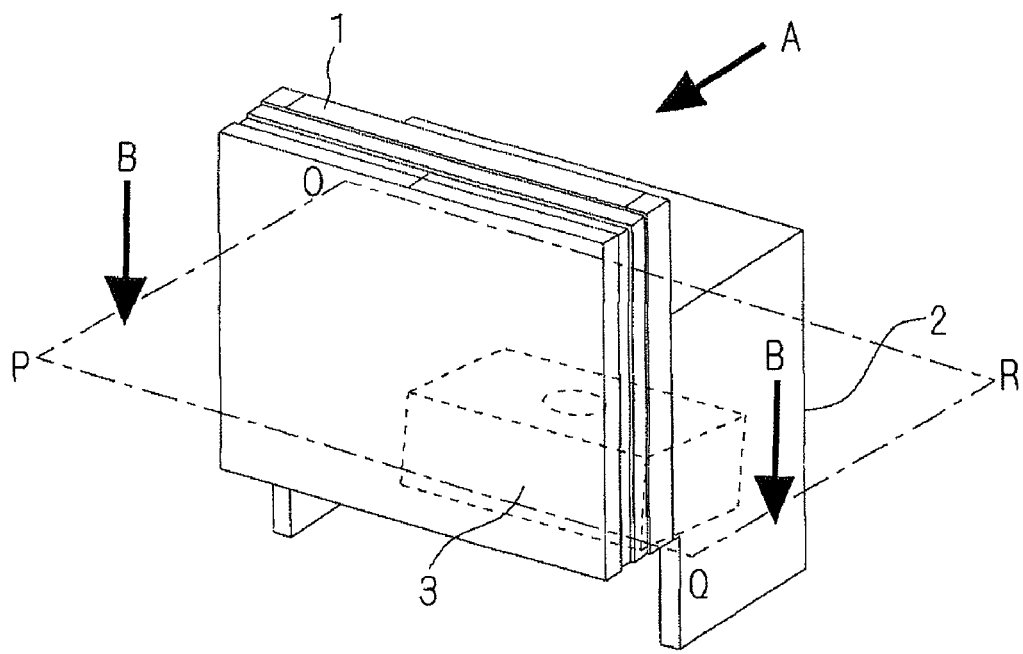

F I G . 2
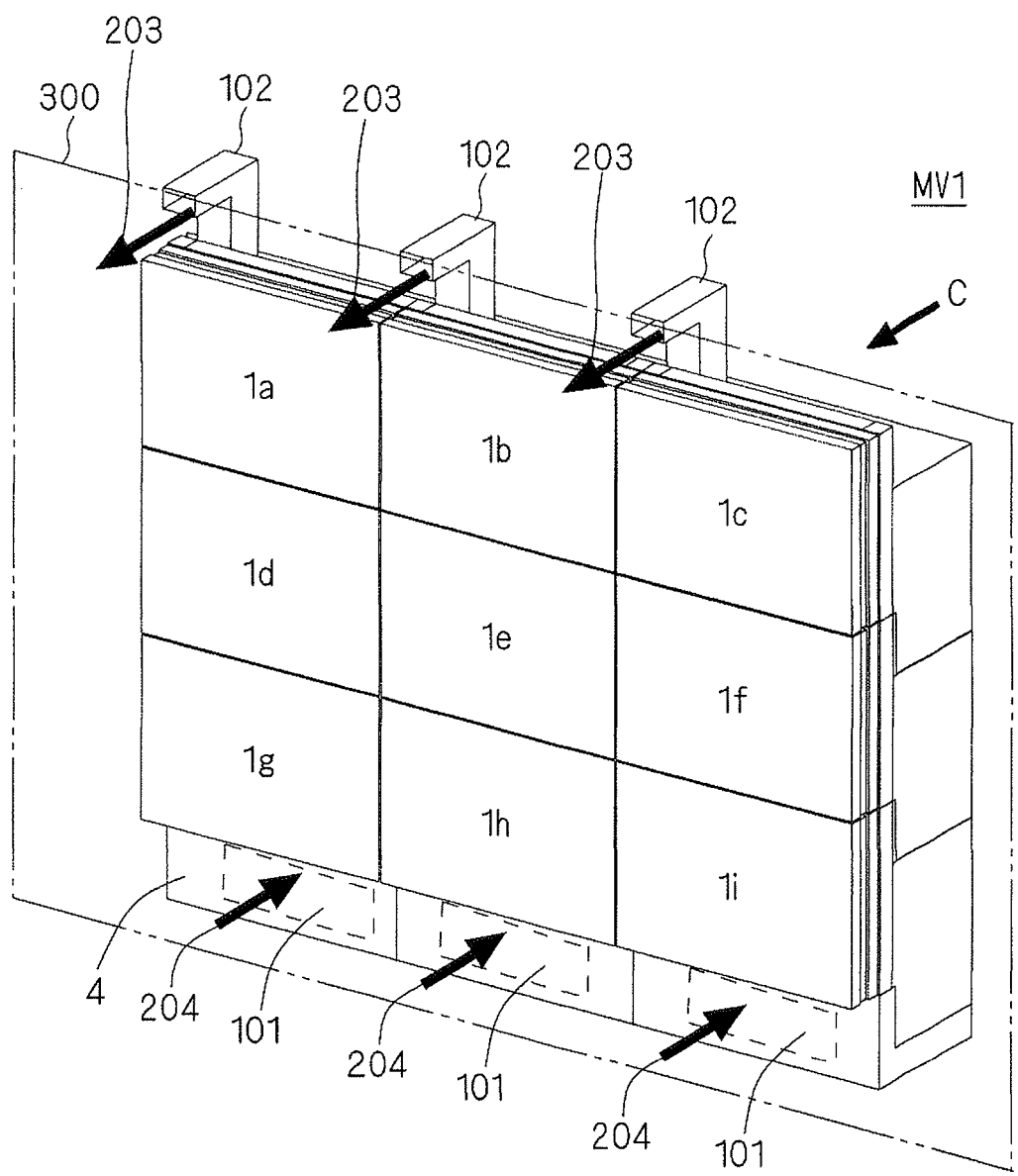

F I G . 1 0
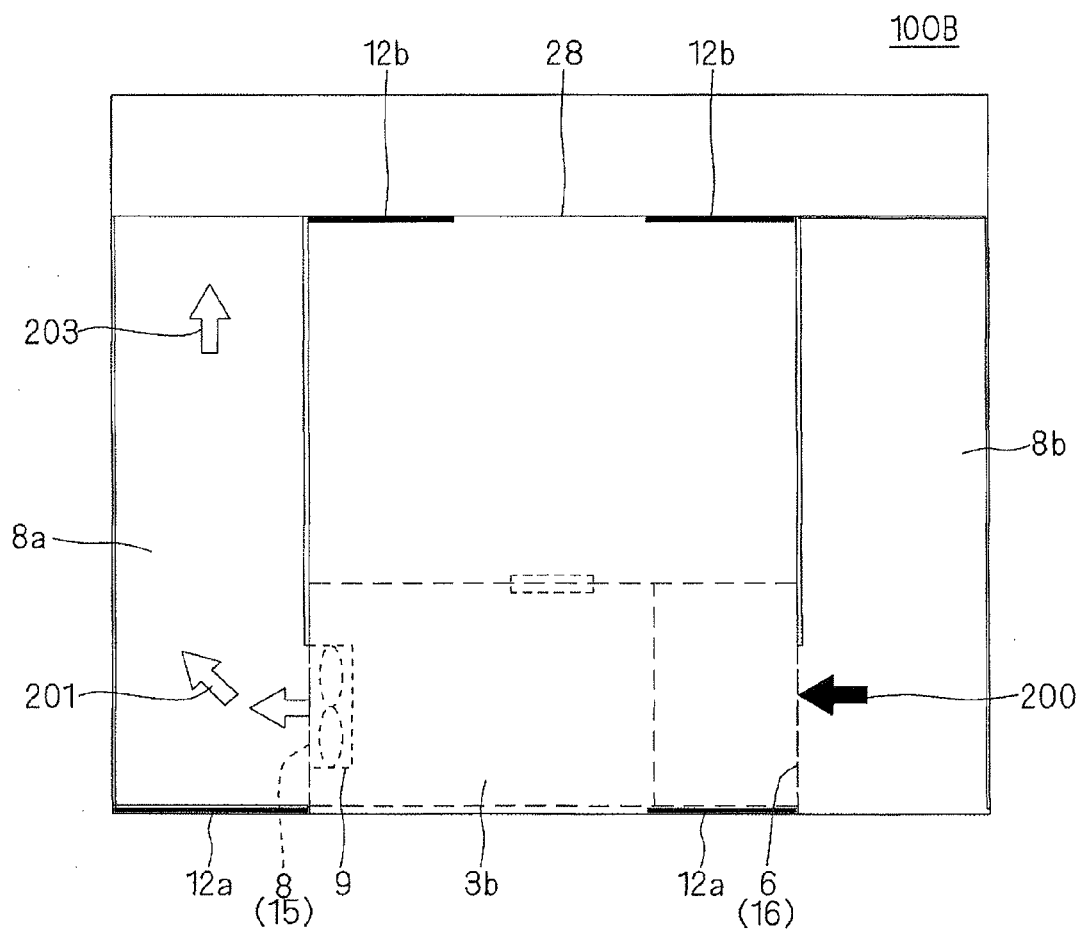

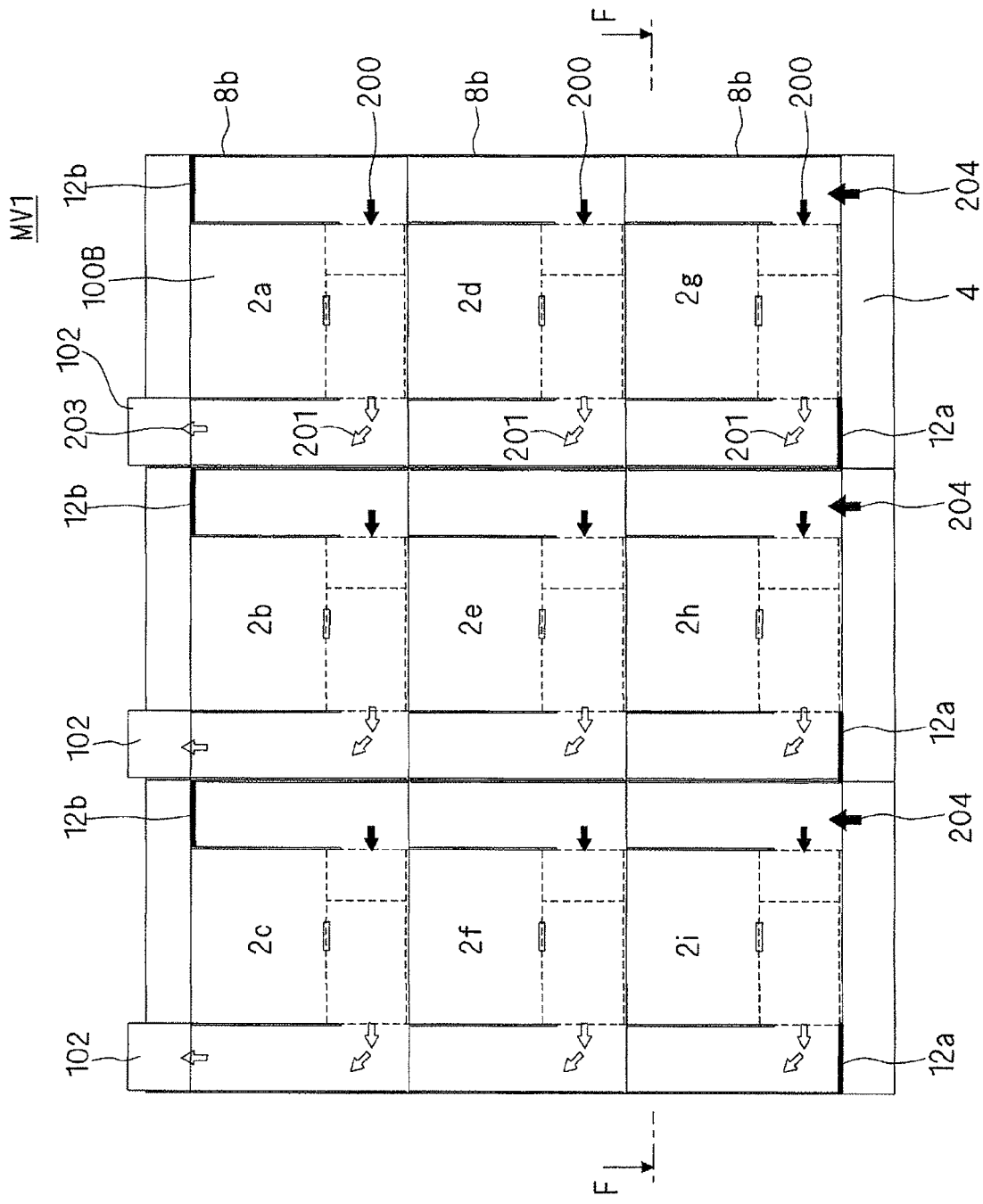

IMAGE DISPLAY APPARATUS COMPRISING AN ENCLOSURE HAVING FIRST AND SECOND DUCTS AND SHUT-OFF PLATES FOR VENTILATION

BACKGROUND OF THE INVENTION

1. Field of the Invention

The present invention relates to an image display apparatus and, more particularly, to an image display apparatus in which a plurality of projection display apparatuses are combined together to form a large screen.

2. Description of the Background Art

A multi-vision system including an arrangement of a plurality of projection display apparatuses for projecting an image from a projection unit onto a screen is known in the prior art.

As shown, for example, in FIG. 1 and FIG. 2 of Japanese Patent Application Laid-Open No. 8-140024 (1996), the multi-vision system has a structure such that only a screen for forming and displaying an image thereon is not covered with a wall surface but is exposed to the outside and the remaining parts are provided so as to be embedded in the wall. For this reason, the multi-vision system operates in a half sealed condition.

Each of the individual projection display apparatuses has a structure such that a fan for air cooling of the interior of an enclosure is provided to exhaust heat to the outside, as illustrated, for example, in FIG. 1 of Japanese Patent Application Laid-Open No. 2001-343708. However, heat is exhausted to half closed space.

In general, space is often provided for maintenance on the rear side of the multi-vision system. However, when the process for efficiently exhausting heat is insufficient even if the space is provided or when the image display apparatus is of the type in which the maintenance is performed from the screen side, it is impossible to ensure an efficient heat exhaust structure because of the limited space in some cases. In such cases, heat exhausted from the individual projection display apparatuses is retained in the half closed space inside the walls because of the circulation of the heat therein. This gives rise to a situation in which sufficient cooling cannot be achieved by cooling mechanisms of the individual projection display apparatuses. In the case of the insufficient cooling, there is a likelihood that the quality of the image display apparatus is degraded by heat.

To take remedial steps, it is contemplated that a mechanism for compensating for the cooling capability of the image display apparatus is added by providing an air conditioner and the like in the half closed space inside the walls, whereby an air cooling system for the multi-vision system is provided. This, however, presents another problem in that the cost for the placement of the air conditioner and the extension of the period of construction result in increased costs.

SUMMARY OF THE INVENTION

It is an object of the present invention to provide an image display apparatus in which a plurality of projection display apparatuses are combined together to form a large screen, and which includes an efficient cooling mechanism.

According to the present invention, an image display apparatus includes a plurality of projection display apparatuses each for projecting an image from a projection unit onto a screen, the plurality of projection display apparatuses being arranged in a plurality of rows and in a plurality of columns to form a large screen. Each of the projection display apparatuses includes an enclosure for receiving the projection unit therein and for mounting the screen thereon. The enclosure includes: first and second ducts for ventilation provided to the left and right of a region for receiving the projection unit therein and extending in a vertical direction, each of the first and second ducts having a top portion formed with an upper opening and a bottom portion formed with a lower opening; first shut-off plates capable of independently opening and closing the lower openings of the first and second ducts; and second shut-off plates capable of independently opening and closing the upper openings of the first and second ducts. The first and second ducts include first and second openings provided in wall surfaces of the first and second ducts in corresponding relation to the positions of openings of the projection unit so that an air flow path is formed between the first and second ducts through the projection unit. An air flow path throughout the projection display apparatuses arranged in a vertical direction is formed by combining the opening and closing of the lower openings and the upper openings of the first and second ducts by means of the first and second shut-off plates.

In the above-mentioned image display apparatus, the first and second ducts for ventilation are provided to the left and right of the projection unit of the enclosure of each of the projection display apparatuses so that the air flow path is formed throughout the projection display apparatuses arranged in a vertical direction. Thus, outside air is efficiently supplied to the image display apparatus to achieve the efficient cooling of the individual projection display apparatuses. This prevents heat from being retained in the image display apparatus provided in a half sealed condition to prevent the degradation of quality due to heat. Additionally, there is not need to provide an air conditioner and the like in half closed space. This also prevents the increase in costs.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view showing the external appearance of a projection display apparatus according to a preferred embodiment of the present invention;

FIG. 2 is a perspective view showing the external appearance of a multi-vision system according to the preferred embodiment of the present invention;

FIG. 10 is a plan view of the projection display apparatus of the front side maintenance type as seen from the rear side;

FIG. 11 is a plan view of a multi-vision system formed by projection display apparatuses of the front side maintenance type as seen from the rear side;

DESCRIPTION OF THE PREFERRED EMBODIMENTS

Introduction

Prior to the description of a preferred embodiment according to the present invention, the structure of a typical multi-vision system will be described with reference to FIGS. 14 to 17.

Figure 14:
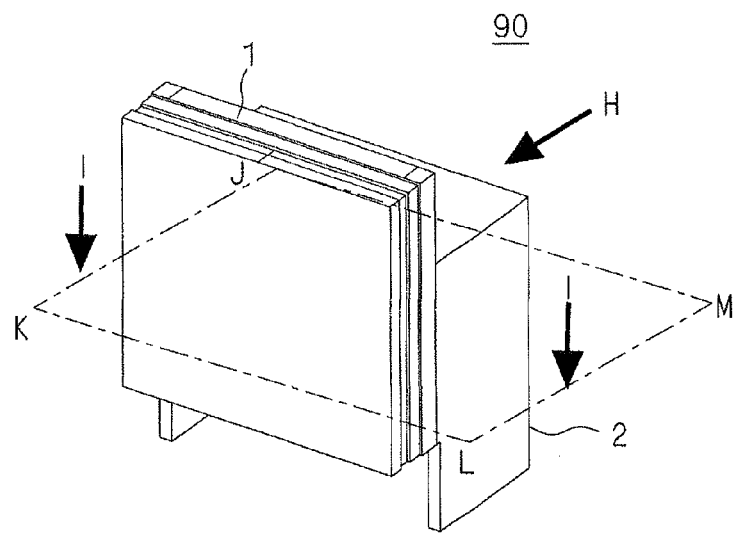
FIG. 14 is a perspective view showing the external appearance of a typical projection display apparatus.

FIG. 14 is a perspective view showing the external appearance of a projection display apparatus 90. As shown in FIG. 14, the projection display apparatus 90 includes a projection unit (not shown) for projecting an image, a translucent screen 1 for forming an image thereon, and an enclosure 2 for fixing the screen 1 thereon, including the projection unit incorporated therein, and cutting off the projected light. The enclosure 2 is constructed firmly enough to allow another projection display apparatus 90 to be stacked thereon.

Figure 15:
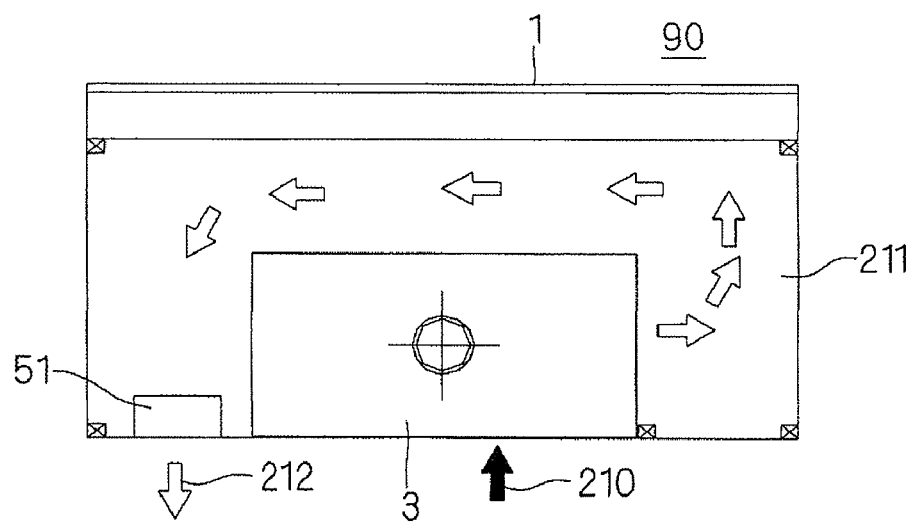
FIG. 15 is a view showing the sectional structure of the typical projection display apparatus.
Figure 16:
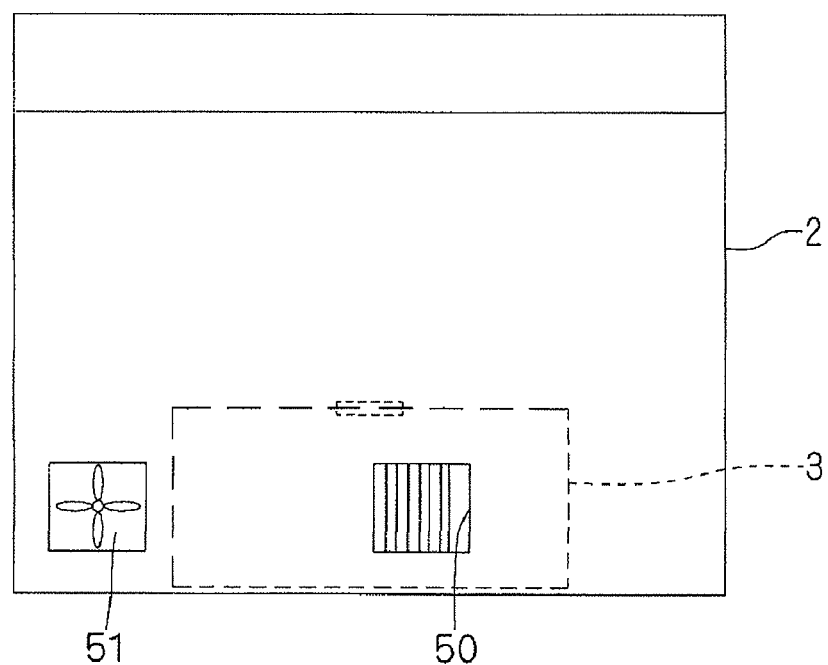
FIG. 16 is a plan view of the typical projection display apparatus as seen from the rear side.

FIG. 15 is a sectional view taken along the plane JKLM of FIG. 14 as seen in the direction of the arrows I, and FIG. 16 is a plan view as seen in the direction of the arrow H of FIG. 14.

As shown in FIG. 16, the projection unit 3 is provided with an inlet port 50 opening toward the outside of the enclosure 2, and the enclosure 2 is provided with an exhaust fan 51 facing outwardly. Thus, the projection display apparatus 90 uses a system in which, as shown in FIG. 15, refresh air 210 is taken thereinto through the inlet port 50, and internal air 212 is exhausted to the outside through the exhaust fan 51, whereby the heat inside the enclosure 2 is exhausted, which in turn achieves the cooling of the interior of the enclosure 2 and the projection unit 3. Thus, the projection display apparatus 90 alone does not particularly cause a thermal problem.

Figure 17:
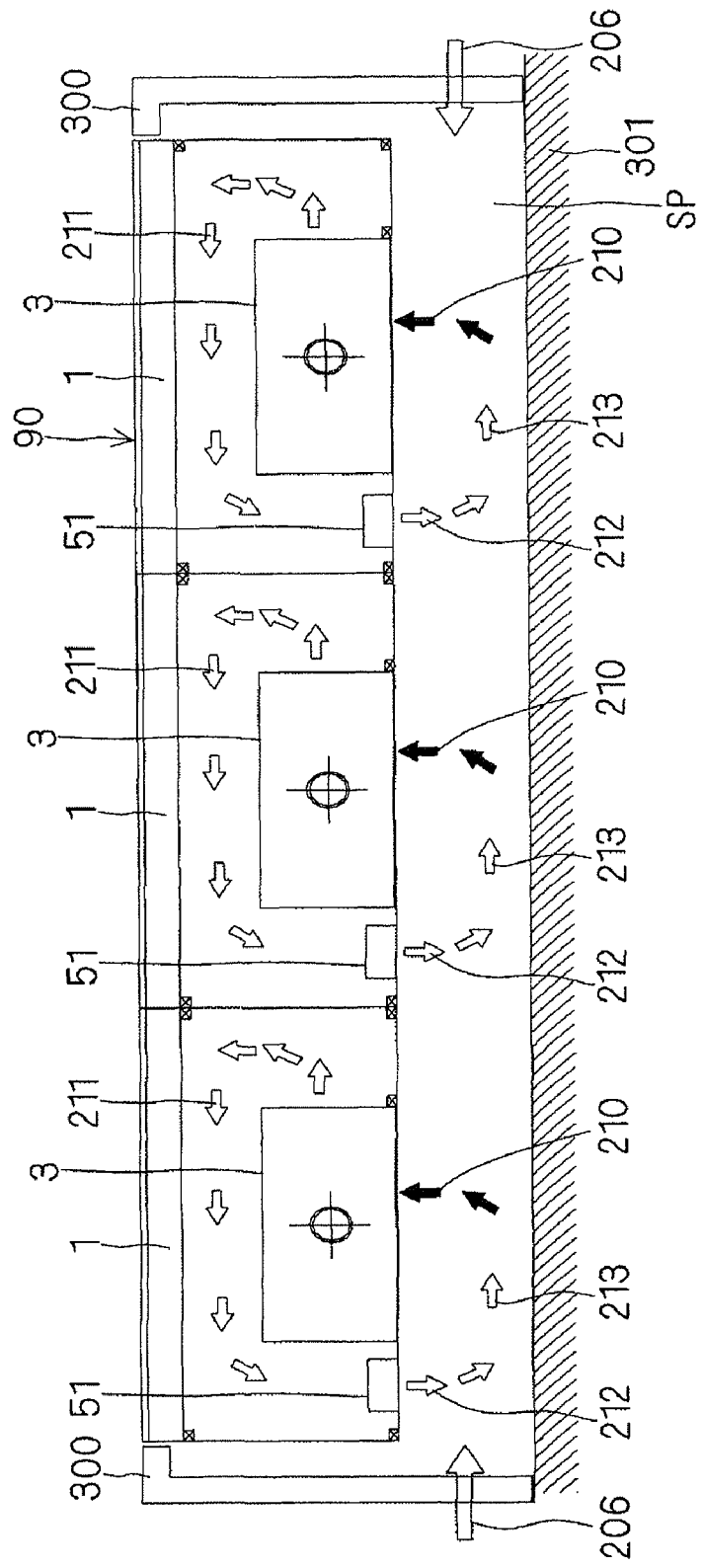
FIG. 17 is a sectional view of a typical multi-vision system.

FIG. 17 is a horizontal sectional view of a multi-vision system MV including a total of nine projection display apparatuses 90 arranged in three rows and three columns, with the projection display apparatuses 90 surrounded by walls in accordance with the actual placement thereof. As illustrated in FIG. 17, the array of projection display apparatuses 90 are surrounded by contour walls 300 and a rear wall 301, and only the screen 1 of each of the projection display apparatuses 90 are exposed to the outside, so that the multi-vision system MV is in a half sealed condition.

In the multi-vision system MV, there is provided space SP for maintenance between the rear surface opposite from the screens 1 of the respective projection display apparatuses 90 and the rear wall 301.

As described with reference to FIGS. 15 and 16, each of the projection display apparatuses 90 takes the refresh air 210 thereinto through the inlet port 50 provided in the rear surface, and exhausts the internal air 212 to the outside through the exhaust fan 51. Although a certain amount of outside air 206 comes into the multi-vision system MV through gaps provided in the contour walls 300, the space SP is half closed space. Thus, the internal air 212 exhausted to the outside through the exhaust fan 51 is contained in the air taken into each of the projection display apparatuses 90 through the inlet port 50, and the projection display apparatuses 90 are warmed by the heat exhausted from themselves.

<Preferred Embodiment>

An image display apparatus according to a preferred embodiment of the present invention will now be described with reference to FIGS. 1 to 13.

FIG. 1 is a perspective view showing the external appearance of a projection display apparatus 100. As shown in FIG. 1, the projection display apparatus 100 includes the projection unit 3 for projecting an image, the translucent screen 1 for forming an image thereon, and the enclosure 2 for fixing the screen 1 thereon, including the projection unit 3 incorporated therein, and cutting off the projected light. The enclosure 2 is constructed firmly enough to allow another projection display apparatus 100 to be stacked thereon. The projection unit 3 includes a lamp for projecting an image and a heat source for an electric circuit and the like, and is required to be cooled appropriately.

FIG. 2 is a perspective view showing the external appearance of a multi-vision system MV1 corresponding to the image display apparatus according to the preferred embodiment of the present invention. The multi-vision system MV1 shown in FIG. 2 is configured such that a total of nine projection display apparatuses 100 are arranged in three rows and three columns, and the projection display apparatuses 100 are stacked on a pedestal 4 having inlet ports 101. Left, middle and right screens in the top row as viewed in FIG. 2 are designated by the reference characters 1a, 1b and 1c; left, middle and right screens in the middle row are designated by the reference characters 1d, 1e and 1f; and left, middle and right screens in the bottom row are designated by the reference characters 1g, 1h and 1i, respectively.

Exhaust air ducts 102 in corresponding relation to the inlet ports 101 are provided in upper portions of the multi-vision system MV1. The projection display apparatuses 100 are fitted in the contour walls 300 having openings (not shown) corresponding to the inlet ports 101 and the exhaust air ducts 102, with only the screens 1a to 1j exposed to the outside.

Thus, although the multi-vision system MV1 is in a half sealed condition, outside air 204 is taken into the multi-vision system MV1 through the inlet ports 101, and exhaust air 203 having absorbed the heat in the multi-vision system MV1 is released from the exhaust air ducts 102.

<Projection Display Apparatus of Rear Side Maintenance Type>

Figure 3:
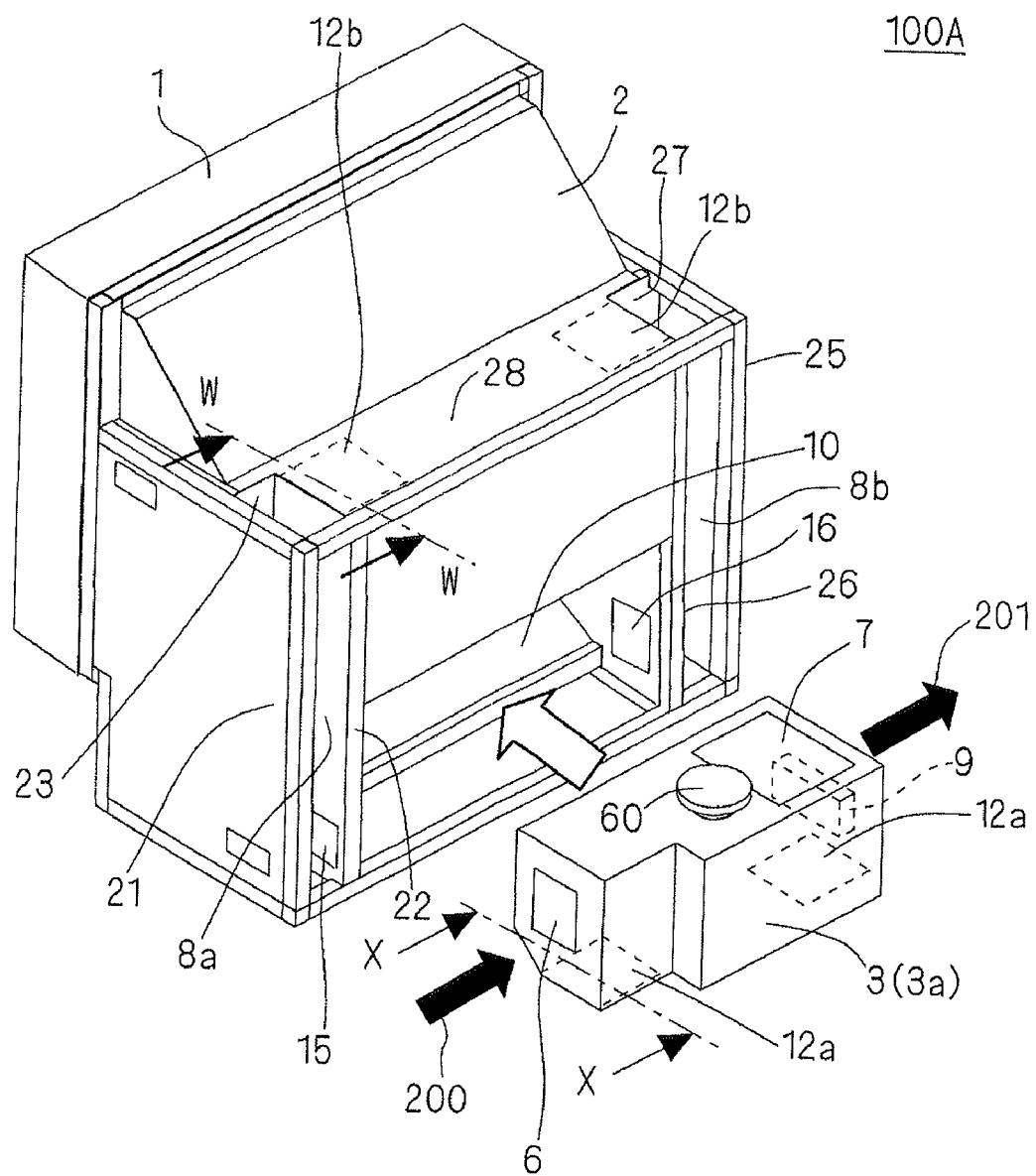
FIG. 3 is a perspective view showing a projection display apparatus of a rear side maintenance type.

FIG. 3 is a perspective view of the projection display apparatus 100 shown in FIG. 1 as seen from the rear side in the direction of the arrow A of FIG. 1, and shows a structure when the projection display apparatus 100 is of a rear side maintenance type in which the maintenance operation thereof is performed from the rear side. The projection display apparatus having such a structure is designated by the reference character 100A.

With reference to FIG. 3, the projection display apparatus 100A of the rear side maintenance type in which the maintenance operation thereof is performed from the rear side is illustrated. The projection unit 3 includes an inlet port 6 for taking in refresh outside air 200, an exhaust fan 9 coupled directly to an exhaust outlet (not shown) for exhausting exhaust air 201 used for the cooling of a heat source in the projection unit 3, and a maintenance opening 7. The projection unit 3 is configured to be mountable to the projection display apparatus 100A after being rotated through 180 degrees about a projection lens 60 within a plane. For the purpose of description, the projection unit mounted to the projection display apparatus 100A, with the inlet port 6 positioned on the lefthand side as seen from the rear side as shown in FIG. 3, is designated by the reference character 3a.

Ducts 8a and 8b extending in a vertical direction along the lefthand and righthand side surfaces as seen from the rear side are provided inside the enclosure 2 constituting the projection display apparatus 100A.

The duct 8a is formed in a region defined between a lefthand wall surface 21 of the enclosure 2 and a lefthand partition wall 22 provided in the enclosure 2 and in parallel to the lefthand wall surface 21. The screen 1 side of the region defined between the lefthand wall surface 21 and the lefthand partition wall 22 is covered with a partition wall 23, and the opposite side of the region from the partition wall 23 is covered with a cover not shown. Thus, the duct 8a functions as a ventilating path of air (an air flow path). Similarly, the duct 8b is formed in a region defined between a righthand wall surface 25 of the enclosure 2 and a righthand partition wall 26 provided in the enclosure 2 and in parallel to the righthand wall surface 25. The screen 1 side of the region defined between the righthand wall surface 25 and the righthand partition wall 26 is covered with a partition wall 27, and the opposite side of the region from the partition wall 27 is covered with a cover not shown. Thus, the duct 8b functions as a ventilating path of air. The top and bottom ends of the duct 8a are open. Similarly, the top and bottom ends of the duct 8b are open.

In the lefthand duct 8a, the lefthand partition wall 22 has an opening 15 positioned in a face-to-face relationship with the inlet port 6 of the projection unit 3a. In the righthand duct 8b, the righthand partition wall 26 has an opening 16 positioned in a face-to-face relationship with the exhaust fan 9. The opening 15 of the duct 8a and the opening 16 of the duct 8b, which are positioned in symmetrical relation and are equal in size to each other, can be brought in a face-to-face relationship with the inlet port 6 and the exhaust fan 9 when the projection unit 3a is mounted to the projection display apparatus 100A after being rotated through 180 degrees within a plane.

The projection unit 3a is received in a region 10 defined between the lefthand partition wall 22 and the righthand partition wall 26, whereby the inlet port 6 and the opening 15 are brought in a face-to-face relationship, and the exhaust fan 9 and the opening 16 are brought in a face-to-face relationship. Thus, the fresh air 200 is supplied through the opening 15, and the exhaust air 201 is exhausted through the opening 16.

Shut-off plates 12a (first shut-off plates) slidable in the directions of the ducts 8a and 8b are provided in bottom portions of the projection unit 3a on the inlet port 6 side and on the exhaust fan 9 side. The shut-off plates 12a are configured to slide onto the lower openings of the ducts 8a and 8b to cover the openings therewith.

Also, shut-off plates 12b (second shut-off plates) slidable in the directions of the ducts 8a and 8b are provided in portions of a top plate 28 of the enclosure 2 which are adjacent to the ducts 8a and 8b. The shut-off plates 12b are configured to slide onto the upper openings of the ducts 8a and 8b to cover the openings therewith.

Nine projection display apparatuses 100A each including the projection unit 3a incorporated in the enclosure 2 are combined together to provide the multi-vision system MV1 shown in FIG. 2.

<Projection Display Apparatus of Front Side Maintenance Type>

Figure 4:
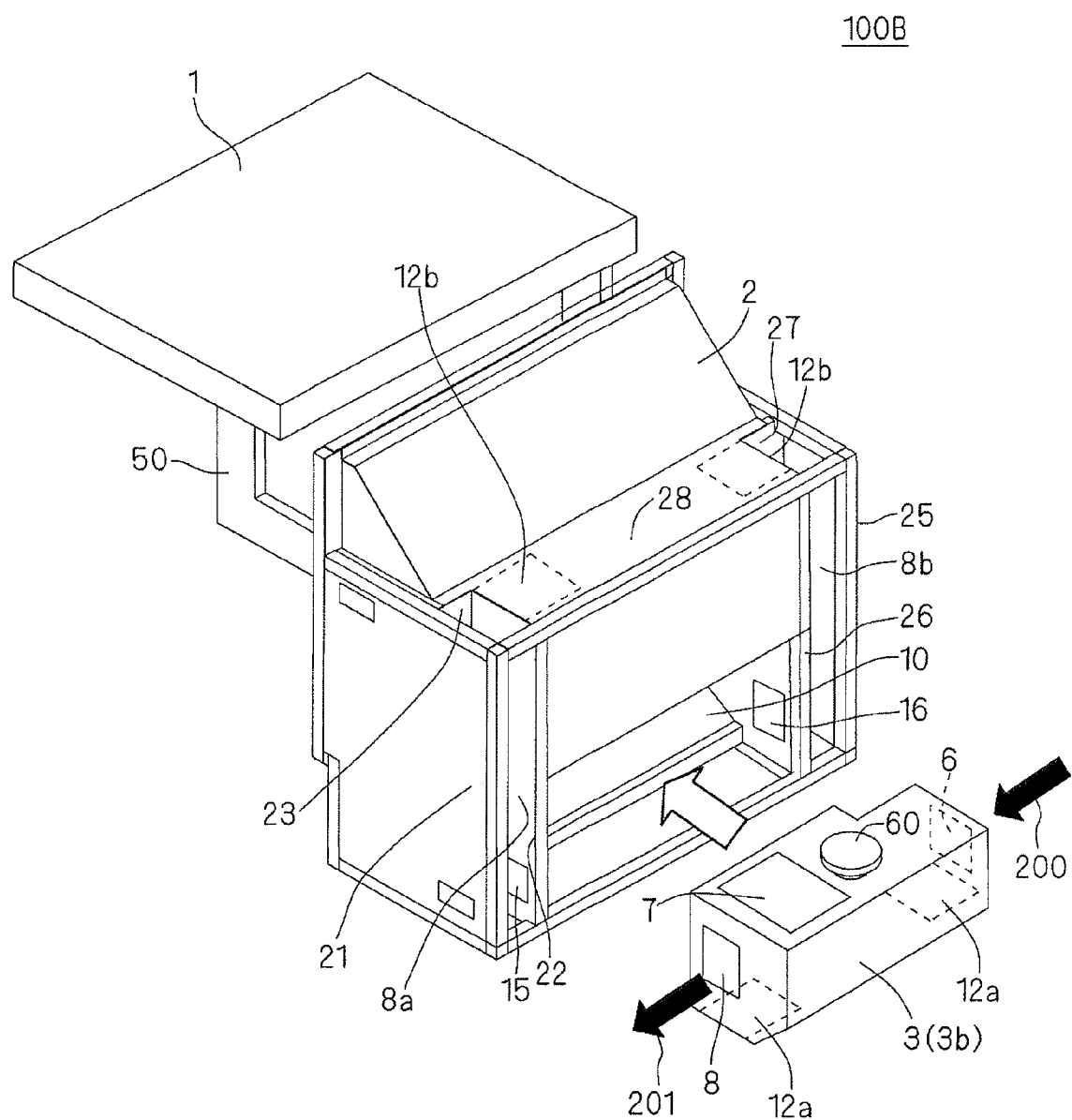
FIG. 4 is a perspective view showing a projection display apparatus of a front side maintenance type.

FIG. 4 is a perspective view of the projection display apparatus 100 shown in FIG. 1 as seen from the rear side in the direction of the arrow A of FIG. 1, and shows a structure when the projection display apparatus 100 is of a front side maintenance type in which the maintenance operation thereof is performed from the screen side. The projection display apparatus having such a structure is designated by the reference character 100B. A multi-vision system constructed by such projection display apparatuses 100B of the front side maintenance type is characterized in requiring no space for maintenance on the rear side. Thus, the screen 1 includes a movable mechanism 50 for opening toward the front side. The movable mechanism 50 is configured to support the screen 1, and to be capable of opening the screen 1 upwardly at an angle of not less than 90 degrees with respect to the front surface of the enclosure 2. The remaining structures of the projection display apparatus 100E of the front side maintenance type are similar to those of the projection display apparatus 100A of the rear side maintenance type shown in FIG. 3. Parts identical with those of the projection display apparatus 100A are designated by like reference numerals and characters, and will not be discussed.

However, unlike the projection unit 3a shown in FIG. 3, a projection unit 3b is mounted to the projection display apparatus 100B after being rotated through 180 degrees about the projection lens 60 within a plane so that the inlet port 6 is positioned on the righthand side as seen from the rear side. For this reason, the projection unit 3b is received in the region 10 defined between the lefthand partition wall 22 and the righthand partition wall 26, whereby the inlet port 6 and the opening 16 are brought in a face-to-face relationship, and an exhaust outlet 8 coupled directly to an exhaust fan (not shown) and the opening 15 are brought in a face-to-face relationship. Thus, the fresh air 200 is supplied through the opening 16, and the exhaust air 201 is exhausted through the opening 15.

In the projection unit 3b, the shut-off plates 12a is also configured to slide onto the lower openings of the ducts 8a and 8b to cover the openings therewith. Nine projection display apparatuses 100B each including the projection unit 3b incorporated in the enclosure 2 are combined together to provide the multi-vision system MV1 shown in FIG. 2.

<Multi-Vision System of Rear Side Maintenance Type>

Figure 5:
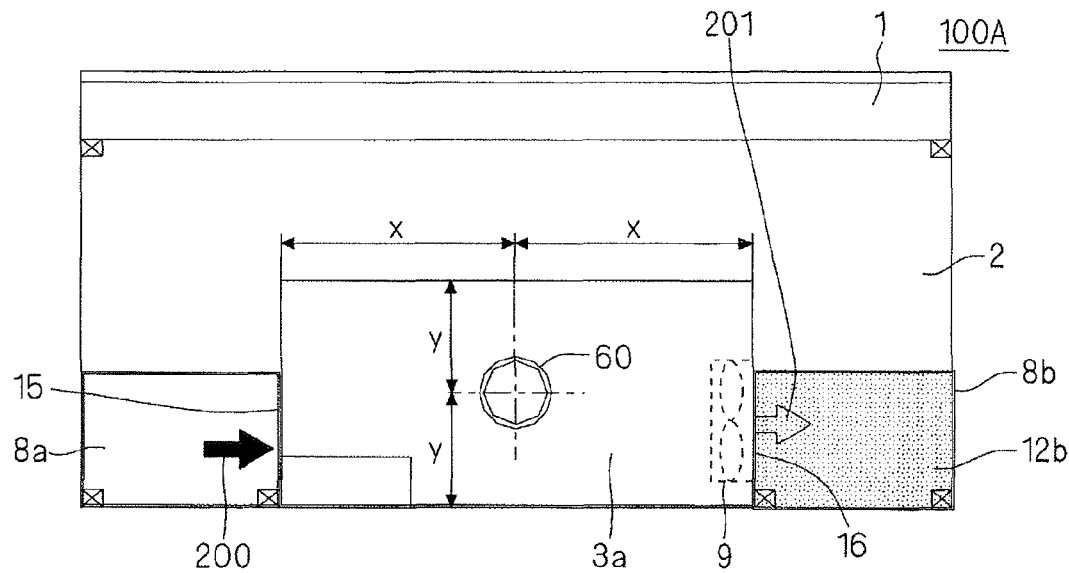
FIG. 5 is a view showing the sectional structure of the projection display apparatus of the rear side maintenance type.
Figure 6:
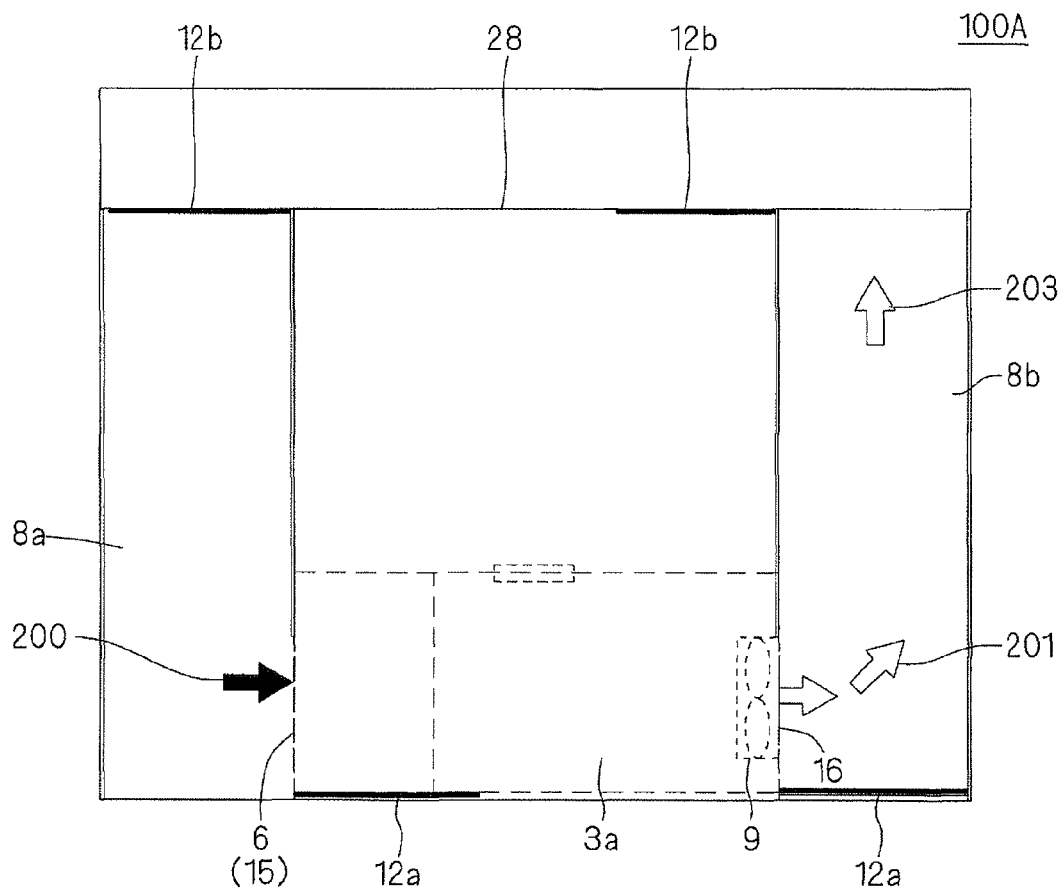
FIG. 6 is a plan view of the projection display apparatus of the rear side maintenance type as seen from the rear side.

FIG. 5 is a sectional view of the projection display apparatus 100 taken along the plane OPQR of FIG. 1 as seen in the direction of the arrows B, and shows the projection display apparatus 100A of the rear side maintenance type with the projection unit 3a incorporated therein. FIG. 6 is a plan view of the projection display apparatus 100A shown in FIG. 5 as seen from the rear side. In FIG. 6, the projection display apparatus 100A is illustrated so that the internal structure of the enclosure 2 is seen.

As shown in FIG. 5, the contour of the projection unit 3a is sized such that the lefthand and righthand dimensions x with respect to the central position of the projection lens 60 are equal to each other, and such that the front and rear dimensions y with respect thereto are equal to each other. Thus, the projection unit 3a is mountable to the projection display apparatus 100A after being rotated through 180 degrees about the projection lens 60 within a plane.

With reference to FIG. 5, the lower opening of the duct 8b is covered with a corresponding one of the two shut-off plates 12a, and the corresponding shut-off plate 12a is shown as shaded. The lower opening of the duct 8a is not covered, and a corresponding one of the two shut-off plates 12a is received in the bottom surface of the projection unit 3a on the inlet port 6 side, as shown in FIG. 6.

Of the two shut-off plates 12b provided at the top plate 28 of the enclosure 2, one shut-off plate 12b provided adjacent to the duct 8a is disposed to cover the upper opening of the duct 8a, and the other shut-off plate 12b is received in the top plate 28. The shut-off plates 12a and 12b allow air to flow in one direction when any one of the shut-off plates 12a and 12b for each of the ducts 8a and 8b is placed to shut off the air flow path. However, the combination of the shut-off plates 12a and 12b to be shut off is not limited.

With reference to FIG. 6, by the rotation of the exhaust fan 9 of the projection unit 3a, the fresh air 200 is guided from the opening 15 of the duct 8a (the inlet port 6 of the projection unit 3a) into the projection unit 3a. The fresh air 200 passes through the projection unit 3a, and is exhausted through the opening 16 of the duct 8b by the exhaust fan 9 as the exhaust air 201. Then, the exhaust air 201 passes through the duct 8b, and is guided to the upper opening of the duct 8b. The exhaust air 201 is guided only upwardly because the lower opening of the duct 8b is covered with the shut-off plate 12a.

Figure 7:
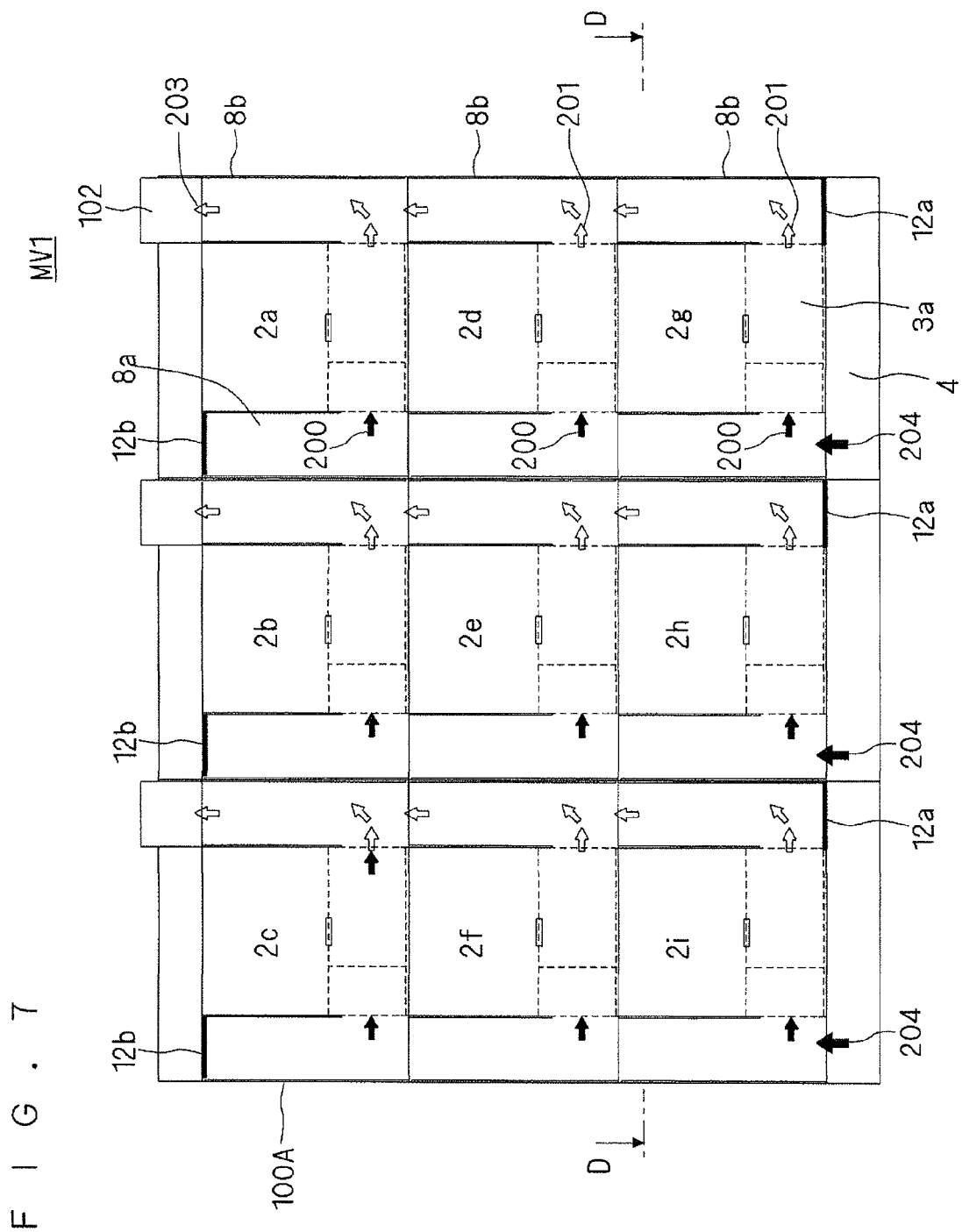
FIG. 7 is a plan view of a multi-vision system formed by projection display apparatuses of the rear side maintenance type as seen from the rear side.

FIG. 7 is a rear view (as seen in the direction of the arrow C of FIG. 2) of the multi-vision system MV1 constructed by arranging a total of nine projection display apparatuses 100A having the above-mentioned structure in three rows and three columns. For purposes of convenience, the multi-vision system MV1 is illustrated in FIG. 7 so that that the internal structure of each of the enclosures 2 is seen. Right, middle and left enclosures in the top row as viewed in FIG. 7 are designated by the reference characters 2a, 2b and 2c; right, middle and left enclosures in the middle row are designated by the reference characters 2d, 2e and 2f; and right, middle and left enclosures in the bottom row are designated by the reference characters 2g, 2h and 2i, respectively.

The duct 8a serving as an air intake duct guides the outside air 204 taken in through an opening (not shown) formed in the pedestal 4 as the refresh air 200 into each of the projection units 3a. At this time, the upper opening of the duct 8a is covered with the shut-off plate 12b only in each of the enclosures 2a, 2b and 2c disposed in the top row. This enables only the outside air coming from the pedestal 4 to enter each of the projection units 3a.

Then, the air 200 passes through each of the projection units 3a, and is thereafter exhausted as the exhaust air 201. The exhaust air 201 passes through the duct 8b, and is guided to the upper opening of the duct 8b. Then, the exhaust air 201 is released through the exhaust air ducts 102 connected to the upper openings of the ducts 8b of the enclosures 2a, 2b and 2c, respectively, disposed in the top row as the exhaust air 203 to the outside.

The lower opening of the duct 8b is covered with the shut-off plate 12a only in each of the enclosures 2g, 2h and 2i disposed in the bottom row. This prevents the exhaust air 201 from leaking toward the pedestal 4. The column of the enclosures 2a, 2d and 2g, the column of the enclosures 2b, 2e and 2h, and the column of the enclosures 2c, 2f and 2j form individual air intake and exhaust systems independent of each other. The outside air 204 coming from the pedestal 4 is also supplied to the columns independently of each other.

Figure 8:
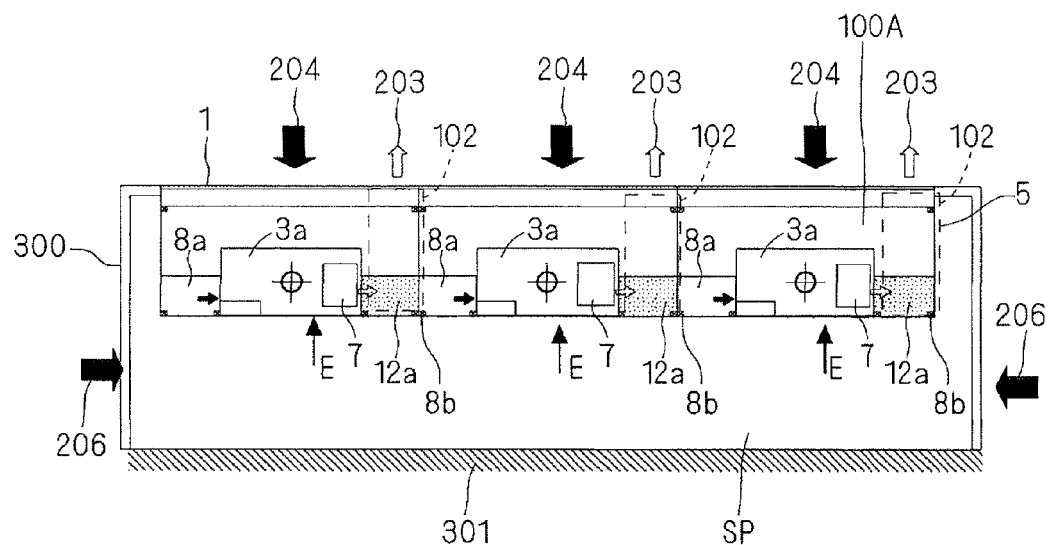
FIG. 8 is a sectional view of the multi-vision system formed by the projection display apparatuses of the rear side maintenance type.

FIG. 8 is a sectional view taken along the line D-D of FIG. 7. With reference to FIG. 8, the multi-vision system MV1 shown in. FIG. 2 is surrounded by the contour walls 300 and the rear wall 301, and is in a half sealed condition.

As shown in FIG. 8, the space SP for maintenance is provided between the rear surfaces opposite from the screens 1 of the respective projection display apparatuses 100A and the rear wall 301. The direction of the arrows E shown in FIG. 8 is the direction of maintenance. For the maintenance, the projection units 3a are pulled out, and the maintenance is performed through the maintenance openings 7.

Openings may be provided, for example, in the side surfaces of the contour walls 300 to guide the outside air 206 in addition to the outside air 204 supplied through the inlet ports 101 of the pedestal 4.

<Multi-Vision System of Front Side Maintenance Type>

Figure 9:
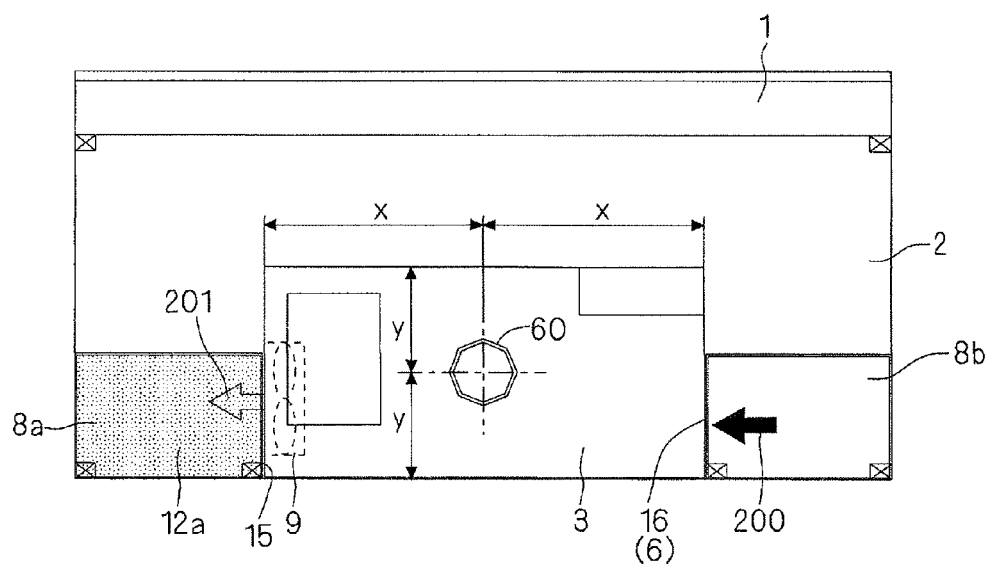
FIG. 9 is a view showing the sectional structure of the projection display apparatus of the front side maintenance type.

FIG. 9 is a sectional view of the projection display apparatus 100 taken along the plane OPQR of FIG. 1 as seen in the direction of the arrows B, and shows the projection display apparatus 100B of the front side maintenance type with the projection unit 3b incorporated therein. FIG. 10 is a plan view of the projection display apparatus 100B shown in FIG. 9 as seen from the rear side. In FIG. 9, the projection display apparatus 100B is illustrated so that the internal structure of the enclosure 2 is seen.

As shown in FIG. 9, the contour of the projection unit 3b is sized such that the lefthand and righthand dimensions x with respect to the central position of the projection lens 60 are equal to each other, and such that the front and rear dimensions y with respect thereto are equal to each other. Thus, the projection unit 3b is mountable to the projection display apparatus 100B after being rotated through 180 degrees about the projection lens 60 within a plane.

Thus, the projection unit 3 may be used either as the projection unit 3a for the projection display apparatus 100A of the rear side maintenance type or as the projection unit 3b for the projection display apparatus 100B of the front side maintenance type. In this manner, the projection unit 3 is high in general versatility.

With reference to FIG. 9, the lower opening of the duct 8a is covered with a corresponding one of the two shut-off plates 12a, and the corresponding shut-off plate 12a is shown as shaded. The lower opening of the duct 8b is not covered, and a corresponding one of the two shut-off plates 12a is received in the bottom surface of the projection unit 3b on the inlet port 6 side, as shown in FIG. 10.

The two shut-off plates 12b provided at the top plate 28 of the enclosure 2 are both shown as received in the top plate 28. However, when the shut-off plates 12b are placed to shut off the upper opening of the duct 8b, the refresh air 200 is guided from the inlet port 6 of the projection unit 3b into the projection unit 3b. The fresh air 200 passes through the projection unit 3b, and is exhausted through the opening 15 of the duct 8a by the exhaust fan 9 as the exhaust air 201. Then, the exhaust air 201 passes through the duct 8a, and is guided to the upper opening of the duct 8a. The exhaust air 201 is guided only upwardly because the lower opening of the duct 8a is covered with the shut-off plate 12a.

FIG. 11 is a rear view (as seen in the direction of the arrow C of FIG. 2) of the multi-vision system MV1 constructed by arranging a total of nine projection display apparatuses 100B having the above-mentioned structure in three rows and three columns. For purposes of convenience, the multi-vision system MV1 is illustrated in FIG. 11 so that that the internal structure of each of the enclosures 2 is seen. Parts identical with those shown in FIG. 7 are designated by like reference numerals and characters, and will not be discussed.

As shown in FIG. 11, the duct 8a serving as an air intake duct guides the outside air 204 taken in through an opening (not shown) formed in the pedestal 4 as the fresh air 200 into each of the projection units 3b. At this time, the upper opening of the duct 8a is covered with the shut-off plate 12b only in each of the enclosures 2a, 2b and 2c disposed in the top row.

This enables only the outside air coming from the pedestal 4 to enter each of the projection units 3b.

Then, the air 200 passes through each of the projection units 3b, and is thereafter exhausted as the exhaust air 201. The exhaust air 201 passes through the duct 8a, and is guided to the upper opening of the duct 8a. Then, the exhaust air 201 is released through the exhaust air ducts 102 connected to the upper openings of the ducts 8a of the enclosures 2a, 2b and 2c, respectively, disposed in the top row as the exhaust air 203 to the outside. The exhaust air ducts 102 are configured to be attachable to and detachable from the ducts 8a and 8b.

The lower opening of the duct 8a is covered with the shut-off plate 12a only in each of the enclosures 2g, 2h and 2i disposed in the bottom row. This prevents the exhaust air 201 from leaking toward the pedestal 4.

The column of the enclosures 2a, 2d and 2g, the column of the enclosures 2b, 2e and 2h, and the column of the enclosures 2c, 2f and 2j form individual air intake and exhaust systems independent of each other. The outside air 204 coming from the pedestal 4 is also supplied to the columns independently of each other.

Figure 12:
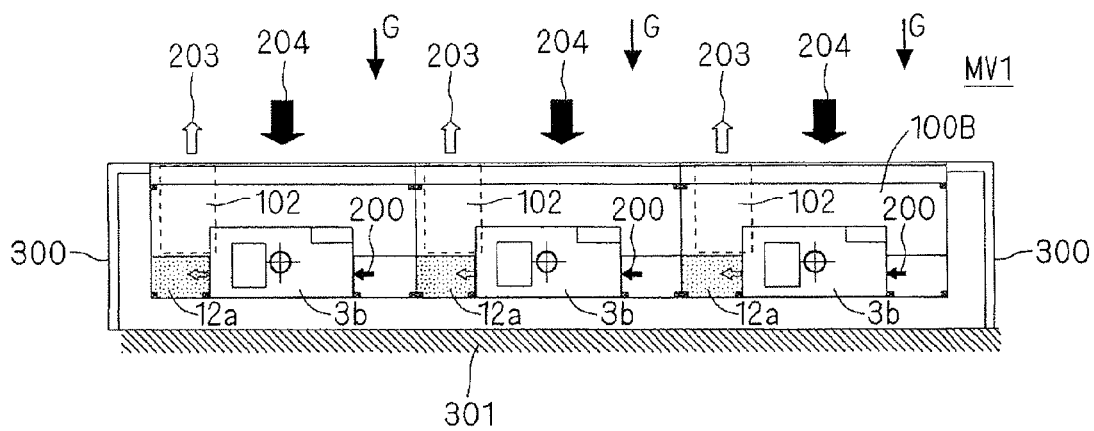
FIG. 12 is a sectional view of the multi-vision system formed by the projection display apparatuses of the front side maintenance type.

FIG. 12 is a sectional view taken along the line F-F of FIG. 8. With reference to FIG. 12, the multi-vision system MV1 shown in FIG. 2 is surrounded by the contour walls 300 and the rear wall 301, and is in a half sealed condition.

In the multi-vision system MV1 of the front side maintenance type, as shown in FIG. 12, the direction of the arrows G shown in FIG. 12 is the direction of maintenance. For the maintenance, the projection units 3b are pulled out, and the maintenance is performed through the maintenance openings 7. For this reason, there is provided no space for maintenance on the rear surface side. Thus, the cooling system using the ducts 8a and 8b is very effective in the multi-vision system MV1 of the front side maintenance type.

<Construction of Shut-Off Plates>

Figure 13:
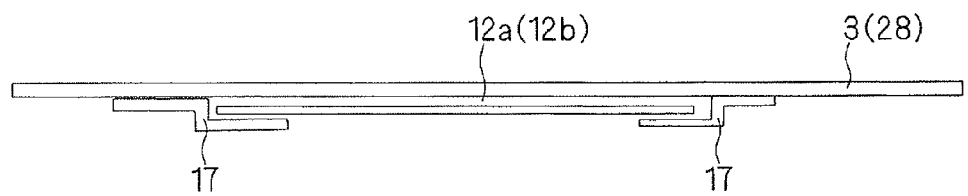
FIG. 13 is a sectional view for illustrating the construction of a shut-off plate.

FIG. 13 is a sectional view taken along the line X-X and the line W-W of FIG. 3.

As shown in FIG. 13, each of the shut-off plates 12a is provided under the lower surface of the projection unit 3, and is guided by a pair of guides 17 provided along opposite ends of shut-off plate 12a as seen in a direction orthogonal to the direction in which the shut-off plates 12a slide to have a structure slidable over the lower openings of the ducts 8a and 8b.

Similarly, each of the shut-off plates 12b is provided under the top plate 28 of the enclosure 2, and is guided by a pair of guides 17 provided along opposite ends of shut-off plate 12b as seen in a direction orthogonal to the direction in which the shut-off plates 12b slide to have a structure slidable over the upper openings of the ducts 8a and 8b.

The use of the shut-off plates 12a and 12b in accordance with the construction of the multi-vision system MV1 allows the air flow path to be shut off appropriately, thereby achieving effective cooling.

<Effects>

In each of the projection display apparatuses 100 according to the preferred embodiment of the present invention, as discussed hereinabove, the ducts 8a and 8b for ventilation are provided to the left and right of the projection unit 3 to form the air flow paths for the passage of the outside air 204 throughout the plurality of projection display apparatuses 100. Thus, the outside air 204 is efficiently supplied to the multi-vision system MV1 to achieve the efficient cooling of the projection display apparatuses 100. This prevents heat from being retained in the multi-vision system MV1 provided in the half sealed condition to prevent the degradation of quality due to heat. Additionally, there is not need to provide an air conditioner and the like in the half closed space. This also prevents the increase in costs.

<Modifications>

In the projection units 3a and 3b of the projection display apparatuses 100A and 100B described above, the fan is provided on the exhaust outlet side to serve as the exhaust fan 9. Instead, a fan may be provided on the inlet port 6 side to serve as an air intake fan.

As an example, the present invention is applicable to an apparatus in which it is impossible to provide space for maintenance on the rear side and to an apparatus into which a purpose-built cooling device cannot be incorporated in a plurality of image display apparatuses to be placed in combination on a wall surface and the like.

While the invention has been described in detail, the foregoing description is in all aspects illustrative and not restrictive. It is understood that numerous other modifications and variations can be devised without departing from the scope of the invention.

What is claimed is:

1. An image display apparatus including a plurality of projection display apparatuses each for projecting an image from a projection unit onto a screen, the plurality of projection display apparatuses being arranged in a plurality of rows and in a plurality of columns to form a large screen, each of said projection display apparatuses comprising
an enclosure for receiving said projection unit therein and for mounting said screen thereon,
said enclosure including:
first and second ducts for ventilation provided to the left and right of a region for receiving said projection unit therein and extending in a vertical direction, each of said first and second ducts having a top portion formed with an upper opening and a bottom portion formed with a lower opening;
first shut-off plates capable of independently opening and closing the lower openings of said first and second ducts; and
second shut-off plates capable of independently opening and closing the upper openings of said first and second ducts,
said first and second ducts including
first and second openings provided in wall surfaces of said first and second ducts in corresponding relation to the positions of openings of said projection unit so that an air flow path is formed between said first and second ducts through said projection unit,
wherein an air flow path throughout said projection display apparatuses arranged in a vertical direction is formed by combining the opening and closing of said lower openings and said upper openings of said first and second ducts by means of said first and second shut-off plates.

2. The image display apparatus according to claim 1, wherein
said projection unit includes
an inlet port and an exhaust outlet disposed so that an air flow path is formed between said first and second ducts in a direction orthogonal to said first and second ducts, and
an exhaust fan coupled directly to said exhaust outlet.

3. The image display apparatus according to claim 2, wherein
said projection unit has a contour sized such that the lefthand and righthand dimensions thereof with respect to a lens for projecting an image are equal to each other and such that the front and rear dimensions thereof with respect thereto are equal to each other;
said inlet port and said exhaust outlet of said projection unit are positioned in symmetrical relation and are equal in size to each other; and
said projection unit is receivable in said region of said enclosure after being rotated through 180 degrees about said lens.

* * * * *